US010003656B2

(12) United States Patent
Zhou et al.

(10) Patent No.: US 10,003,656 B2
(45) Date of Patent: Jun. 19, 2018

(54) SYSTEM AND METHOD FOR SHARING DATA/OBJECTS BETWEEN ELECTRONIC DEVICES VIA IMS INFRASTRUCTURE (71) Applicant: Samsung Electronics Co., Ltd., Gyeonggi-do (KR)

(72) Inventors: Zhinan Zhou, Sammamish, WA (US); Qia Wang, Bellevue, WA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 201 days.

(21) Appl. No.: 14/948,772

(22) Filed: Nov. 23, 2015

(65) Prior Publication Data
US 2017/0149903 A1 May 25, 2017

(51) Int. Cl.
*G06F 15/16* (2006.01)
*H04L 29/08* (2006.01)

(52) U.S. Cl.
CPC ............ *H04L 67/141* (2013.01); *H04L 67/02* (2013.01); *H04L 67/327* (2013.01)

(58) Field of Classification Search
CPC ...... H04L 67/141; H04L 67/02; H04L 67/327
USPC ................... 709/227, 232, 235, 245
See application file for complete search history.

(56) References Cited

U.S. PATENT DOCUMENTS

| 2008/0096544 | A1* | 4/2008 | McNamara | H04L 65/4023 455/424 |
| 2009/0144429 | A1* | 6/2009 | Astrom | H04L 65/40 709/227 |
| 2010/0287251 | A1* | 11/2010 | Mahdi | H04L 12/1822 709/206 |
| 2010/0309847 | A1* | 12/2010 | Bharadwaj | H04W 48/18 370/328 |
| 2012/0117539 | A1* | 5/2012 | Vorthmann | G06F 8/60 717/120 |
| 2014/0372557 | A1* | 12/2014 | Buckley | H04L 67/104 709/217 |
| 2015/0055550 | A1* | 2/2015 | Suryavanshi | H04W 60/00 370/328 |

(Continued)

OTHER PUBLICATIONS

"Rich Communication Suite 5.0 Advanced Communications Services and Client Specification," Version 1.0, GSM Association, GSMA, Apr. 19, 2012, 336 pages.

(Continued)

*Primary Examiner* — David Lazaro
*Assistant Examiner* — Berhanu Shitayewoldetsadi (57) ABSTRACT

A system and method are provided for sharing data and/or objects between electronic devices via an IMS infrastructure. First and second applications of first and second electronic devices exchange a capability via the IMS infrastructure. The capability is defined by a developer of the first application. The capability is not defined in the UCE standard. The capability relates to a data structure describing a status of one of the applications. An IMS connection is established between the applications via the IMS infrastructure. Either data relating to a status of the first application stored in the data structure is sent to the second application via the IMS connection, or data relating to a status of the second application stored in the data structure is received at the first application via the IMS connection.

20 Claims, 8 Drawing Sheets (56) References Cited

U.S. PATENT DOCUMENTS

2015/0056991 A1* 2/2015 Seth ..................... H04W 60/00
455/435.1

OTHER PUBLICATIONS

Foreign Communication From a Related Counterpart Application, European Application No. 16174512.0-1853, Extended European Search Report dated Mar. 23, 2017. 10 pages.

* cited by examiner

SYSTEM AND METHOD FOR SHARING DATA/OBJECTS BETWEEN ELECTRONIC DEVICES VIA IMS INFRASTRUCTURE

TECHNICAL FIELD

The present application relates generally to sharing data between electronic devices and, more specifically, to a system and method for sharing data and/or objects between electronic devices via an IMS infrastructure.

BACKGROUND

The IP Multimedia Subsystem or IP Multimedia Core Network Subsystem (IMS) is an architectural framework for delivering IP multimedia services. Rich Communication Suite (RCS), built on top of IMS infrastructure, is designed to offer richer communication experiences for mobile users. RCS specifications support standardized services such as Standalone Message, 1-to-1 Chat, Group Chat, Social Presence Information, File Transfer, etc. RCS (and its foundation: IMS infrastructure) provide predominant communication services between mobile devices.

Two protocols that are utilized in the IMS network are Session Initiation Protocol (SIP) and Message Session Relay Protocol (MSRP). SIP may be used for session setup and session negotiation, while MSRP (running on top of TCP) may be used to transmit data.

SUMMARY

In a first embodiment, a method for sharing data between electronic devices via an IMS infrastructure includes a first application of one electronic device exchanging a capability with a second application of another electronic device via the IMS infrastructure. The capability is defined by a developer of the first application and the capability is not defined in the UCE standard. The capability relates to a data structure describing a status of one of the applications. The method also includes establishing an IMS connection between the applications via the IMS infrastructure. The method further includes either sending to the second application via the IMS connection data relating to a status of the first application stored in the data structure, or receiving at the first application via the IMS connection data relating to a status of the second application stored in the data structure.

In a second embodiment, an electronic device configured to share data via an IMS infrastructure includes a memory that includes modules that include an IMS module and a first user application. The electronic device also includes a processor that executes one or more of the modules in the memory. The IMS module communicates with a second electronic device via the IMS infrastructure. The first user application exchanges a capability with a second application of the second electronic device via the IMS infrastructure. The capability is defined by a developer of the first application and the capability is not defined in the UCE standard. The capability relates to a data structure describing a status of one of the applications. The first user application also establishes an IMS connection between the first application and the second application via the IMS infrastructure. The first user application further either sends to the second application via the IMS connection data relating to a status of the first application stored in the data structure, or receives via the IMS connection data relating to a status of the second application stored in the data structure.

In a third embodiment, a non-transitory computer readable medium embodying a computer program includes computer readable program code for exchanging a capability via an IMS infrastructure between a first application of a first electronic device and a second application of a second electronic device. The capability is defined by a developer of the first application and the capability is not defined in the UCE standard. The capability relates to a data structure describing a status of one of the applications. The program code also establishes an IMS connection between the first application and the second application via the IMS infrastructure. The program code further, either sends to the second application via the IMS connection data relating to a status of the first application stored in the data structure, or receives at the first application via the IMS connection data relating to a status of the second application stored in the data structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method for sharing data and/or objects between electronic devices via an IMS infrastructure.

Users of mobile electronic devices face problems when describing some element of their current use of their electronic device (e.g., describing a direction on a map, referring to something on an image or a webpage), since the mobile electronic devices typically offer only message services and/or phone call services. Even though an image could be shared between mobile users, such as by sending MMS or RCS file transfer, a framework that supports real time and interactive data/object sharing for electronic device clients is not provided by the IMS infrastructure and its related standards.

The present disclosure describes embodiments of a system and method for providing a real time and interactive object sharing framework that is based on carriers' IMS infrastructure. The framework supports, but not limited to, real time map sharing, real time browser sharing, real time document sharing, etc.

Figure 1:
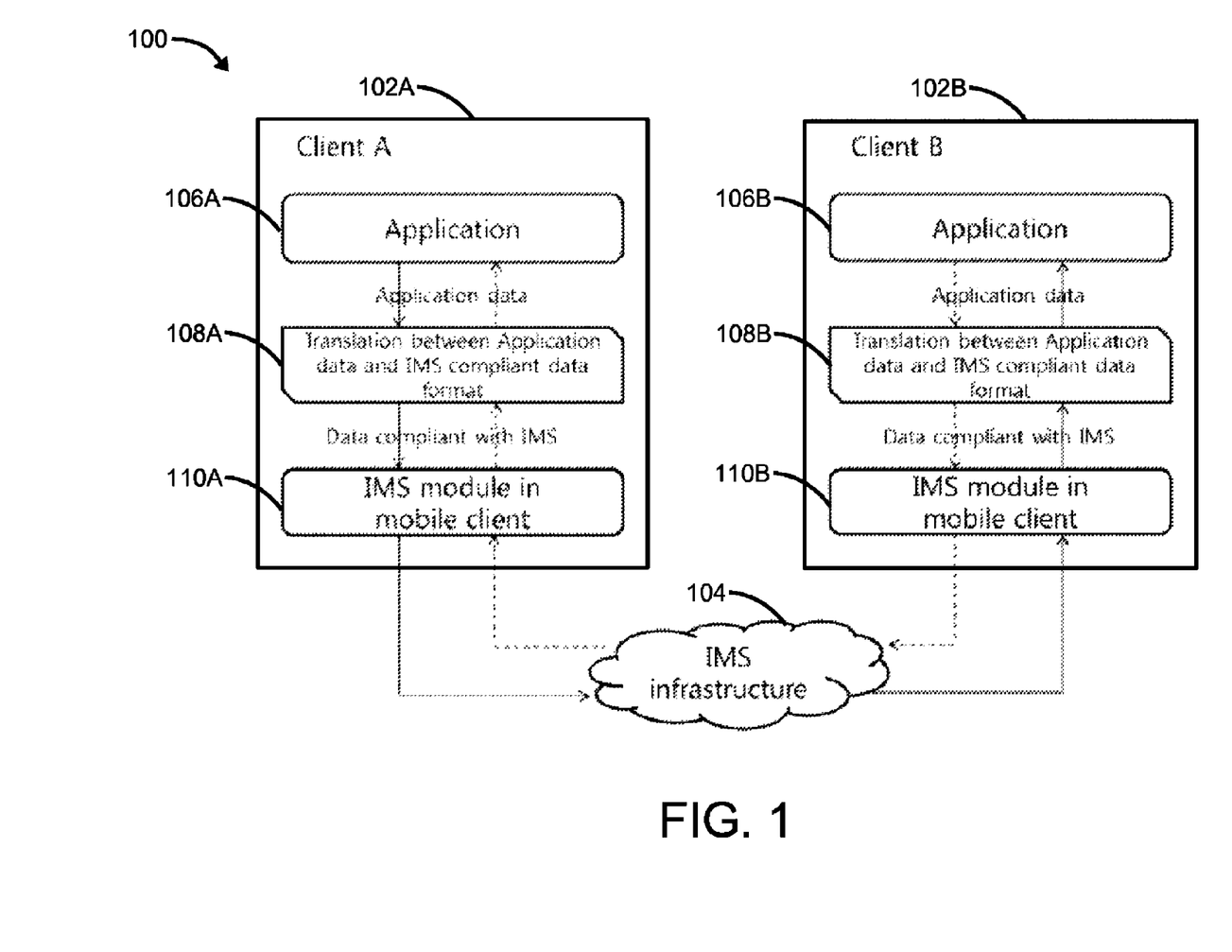
FIG. 1 illustrates a system according to the disclosure.

FIG. 1 illustrates a system 100 according to the disclosure. A first application 106A is operating on a first electronic device 102A. A second application 106B is operating on a second electronic device 102B. The applications 106A and 106B share data according to the disclosure via an IMS infrastructure 104. In a layered system architecture, the application 106A exchanges application data with a translation module 108A, which is configured to translate application data to/from an IMS-compliant data format. The translation module 108A in turn exchanges IMS-compliant data with an IMS module 110A, which is configured to implement one or more elements of the IMS protocol and communicate with electronic device 102B and other electronic devices via the IMS infrastructure 104. The electronic device includes a similar layered software architecture, comprising a translation module 108B and an IMS module 110B.

In the system 100, the applications 106A and 106B are the same application executing on two different electronic devices. In other embodiments, the applications 106A and 106B may be applications of different types that are configured to share data according to the disclosure via the IMS infrastructure 104.

Use of the IMS infrastructure 104 can provide guaranteed quality of service (QoS) for data transmission, where communication network operators offer such guarantees. Further, through use of standard protocols such as SIP and MSRP, systems according to the disclosure can share data between electronic devices from different manufacturers and applications from different developers. Furthermore, embodiments of the disclosure enable a first application 106A running in a first operating system on a first electronic device 102A made by a first manufacturer to engage in real time and interactive data/object sharing with a second application 106B running in a second operating system on a second electronic device 102B made by a second manufacturer.

Figure 2:
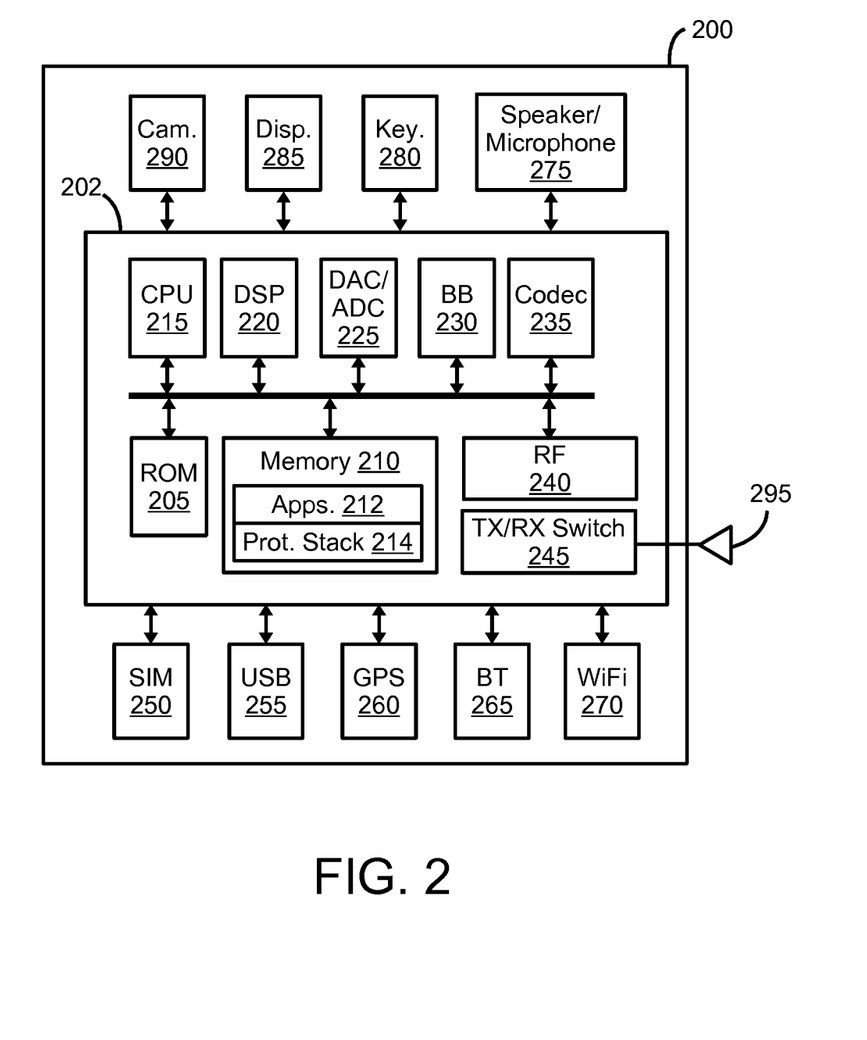
FIG. 2 illustrates hardware elements of an electronic device for use in a system according to the disclosure.

FIG. 2 illustrates hardware elements of an electronic device (ED) 200 for use in a single sign-on system according to the disclosure. The ED 200 in FIG. 2 is a portable device, however, it will be understood that in other embodiments of the disclosure, the electronic device 200 may be a non-portable device. As described above, the ED 200 may be any of a wide variety of types of electronic devices. The ED 200 may include a secure area suitable for providing generic single sign-on functionality, as shown and described with reference to FIGS. 1 and 3.

The ED 200 comprises core circuitry 202, which includes read-only memory (ROM) 205, random access memory (RAM) 210, central processing unit (CPU) 215, digital signal processor (DSP) 220, digital-to-analog converter (DAC)/analog-to-digital converter (ADC) circuitry 225, baseband (BB) circuitry block 230, codec circuitry block 235, radio frequency (RF) circuitry block 240, transmit (TX)/receive (RX) switch 245, and antenna 295.

In one embodiment, ROM 205 may store a boot-routine and other static data and RAM 210 may store an operating system (not shown), applications 212, and protocol stack 214. The ROM 205 and RAM 210 include a trusted execution environment or other secure area in which the confidentiality and integrity of code and data may be ensured. In an advantageous embodiment, ROM 205 and RAM 210 may comprise a single electronically erasable memory, such as a Flash memory, that is used in conjunction with a conventional RAM memory that is used to store dynamic data.

The ED 200 further comprises SIM card interface 250, USB interface 255, GPS receiver 260, Bluetooth (BT) transceiver 265, WiFi (or WLAN) transceiver 270, speaker and microphone circuitry block 275, keyboard 280, display 285, and camera 290. In some embodiment, keyboard 280 and display 285 may be implemented together as a touch screen display.

The CPU 215 is responsible for the overall operation of ED 200. In an exemplary embodiment, the CPU 215 executes applications 212 and protocol stack 214. CPU 215 runs the application layer and a wide variety of applications may be run in a smart phone implementation. Applications 212 may include audio, video, and image/graphics applications, in addition to applications related to embodiments of the present disclosure. CPU 215 may run applications 212 that support various audio formats such as MP3, MP4, WAV, and rm. CPU 215 may run image applications 212 that support JPEG image formats and video applications 212 that support video formats (e.g., MPEG-1 to MPEG-5). CPU 215 may support various operating systems (not shown), such as Symbian, java, android, RT-Linux, Palm, and the like. For time critical applications, CPU 215 runs a real-time operating system (RTOS). In addition to the physical layer, there are other layers, including protocol stack 214, that enable ED 200 to work with a network base station. In an exemplary embodiment, protocol stack 214 is ported on CPU 215.

DAC/ADC circuitry block 225 converts analog speech signals to digital signals, and vice versa, in GD 210. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 230 may be implemented as part of DSP 220, which executes many of the baseband processing functions (i.e., physical layer, Layer 1, or L1 functions). BB circuitry block 230 may be ported on DSP 220 to meet the latency and power requirements of GD 210. BB circuitry block 230 converts voice and data to be carried over the air interface to I/Q baseband signals.

BB circuitry block 230 may change from modem to modem for various air interface standards, such as GSM, CDMA, Wimax, LTE, HSPA, and others. BB circuitry block 230 is often referred to as the physical layer, or Layer 1, or L1. For mobile phones that work on GSM networks, the baseband part (Layer 1) running on DSP 220 and the protocol stack 214 running on CPU 215 are based on the GSM standard. For CDMA mobile phones, the Layer 1 and protocol stack 214 are based on the CDMA standard, and so on, for the LTE and HSPA standards-based mobile phones.

For speech or audio inputs, codec circuitry block 235 may compress and decompress the signal to match the data rate to the frame in which the data is sent. By way of example, codec circuitry block 235 may convert speech at an 8 KHz sampling rate to a 13 kbps rate for a full rate speech traffic channel. To do this, a residually excited linear predictive coder (RELP) speech coder may be which compresses 260 bits into a 20 ms. duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a viterbi decoder (used in receive path). Interleaving may be done for the data, which helps in spreading the error over time, thereby helping the receiver de-interleave and decode the frame correctly.

RF circuitry block 240 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 295 is a metallic object that converts and electro-magnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of GD 210, antenna 295 may support different wire-area standards, including GSM, CDMA, LTE, and WiMAX, as well as short-range standards, including WiFi (WLAN), Bluetooth, and so on.

If antenna 295 comprises only one antenna used for both transmit and receive operations at different times, the TX/RX switch 245 couples both the transmit (TX) path and the receive (RX) path to antenna 295 at different times. TX/RS switch 245 is controlled automatically by DSP 220 based on a GSM frame structure with respect to the physical slot allocated for that particular GSM mobile phone in both the downlink and the uplink. For frequency division duplexing (FDD) systems, TX/RX switch 245 may be implement as a diplexer that acts as filter to separate various frequency bands.

The ED 200 provides connectivity with laptops or other devices using WiFi (or WLAN) transceiver 270, BT transceiver 265, and universal serial bus (USB) interface 255. The ED 200 also uses GPS receiver 260 in applications 212 that require position information. If ED 200 is a conventional smart phone, applications 212 may include many popular applications, such as Facebook, Twitter, a browser, and numerous games that come pre-installed with GD 210.

Speaker and microphone circuitry block 275 comprises microphone circuitry (or mic) that converts acoustic energy (i.e., air pressure changes caused by speech or other sounds) to electrical signals for subsequent processing. Speaker and microphone 275 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

The ED 200 preferably includes camera 290. Presently, almost all mobile phones feature a camera module. Camera 290 may comprise a 12 megapixel, 14 megapixel, or even a 41 megapixel camera.

Display 285 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 280 may comprise a simple matrix type keypad that contains numeric digits (0 to 9), alphabetic characters (A to Z), special characters, and specific function keys. In a more advanced embodiment for a smart phone implementation, keypad 280 may be implemented in the mobile phone software, so that keyboard 280 appears on display 285 and is operated by the user using the touch of a finger tip.

BB circuitry block 230, RF circuitry block 240, TX/RX switch 245, WiFi (or WLAN) transceiver 270, BT transceiver 265, and USB interface 255 comprise a communications interface that enables the ED 200 to communicate either wired or wirelessly with PMDs 104 and RS 106.

According to the principles of the disclosure, applications 212 include an application 106, a translation module 108, and an IMS module 110, as shown and described with reference to FIG. 1.

According to various embodiments of the present disclosure, an electronic device may include communication functionality. For example, an electronic device may be a smart phone, a tablet Personal Computer (PC), a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., navel navigator device, gyroscope, or compass), an avionic electronic device, a security device, an industrial or consumer robot, and/or the like.

According to various embodiments of the present disclosure, an electronic device may e furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing device.

FIGS. 3-9 illustrate exemplary processes and screen displays of applications in a system for sharing data and/or objects between electronic devices via an IMS infrastructure according to the disclosure. For clarity of presentation, the processes and screen displays of FIGS. 3-9 are described as though performed by the EDs 102A, 102B, and 200 shown and described with reference to FIGS. 1 and 2. It will be understood that the processes and screen displays of FIGS. 3-9 may be performed by any suitable system for sharing data and/or objects between electronic devices via an IMS infrastructure according to the disclosure.

Figure 3:
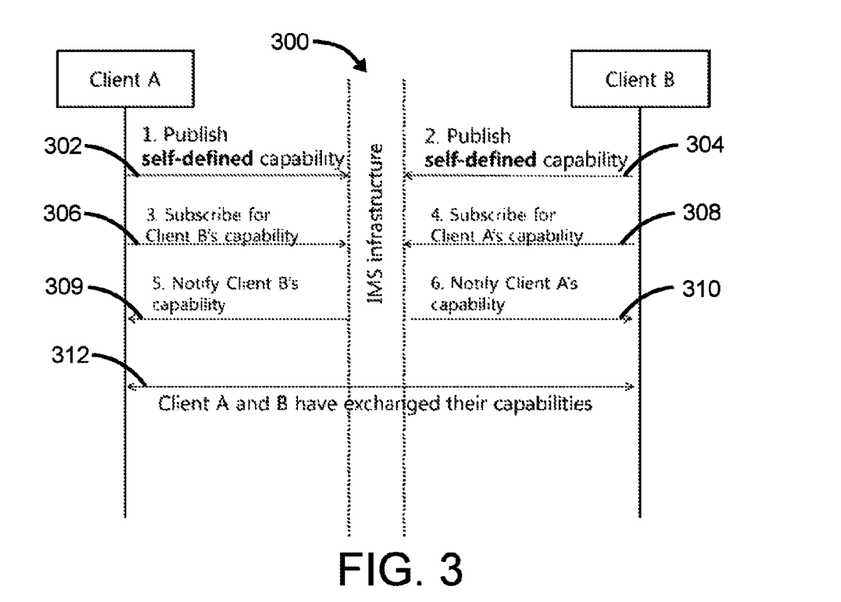
FIG. 3 illustrates a capability exchange process according to the disclosure.

FIG. 3 illustrates a capability exchange process 300 according to the disclosure. In step 302, the application 106A publishes to the IMS infrastructure 104 its capability, which indicates its ability to send and receive messages relating to a data structure describing a status of the application 106A. In step 304, the application 106B publishes to the IMS infrastructure 104 its own capability, which indicates its ability to send and receive messages relating to the same data structure describing a status of the application 106B.

In step 306, the application 106A subscribes with the infrastructure 104 for the capability. In step 308, the application 106B subscribes with the infrastructure 104 for the capability. In step 309, the application 106A receives from the infrastructure 104 notice of the capability of the application 106B. In step 310, the application 106B receives from the infrastructure 104 notice of the capability of the application 106A. In step 312, the applications 106A and 106B are aware of each other's ability to send and receive the capability.

Preferably, the UCE protocol is used to exchange capabilities. In other embodiments, another suitable standard protocol may be used to exchange capabilities. However, the capability exchanged by the applications 106A and 106B is not one of the pre-defined capabilities established in the User Capability Exchange (UCE) standard. Instead, the capability published by the applications 106A and 106B is a self-defined capability. That is, the capability is defined for a particular purpose by a developer of one or both of the applications 106A and 106B.

In other embodiments, an application may publish and subscribe capabilities using a keyword, service tag, designated term, or other identifier, rather than a description of the capability. In such embodiments, the identifier serves as an index to a description of the capability that is available in a storage location available to the applications and the IMS infrastructure.

Figure 4:
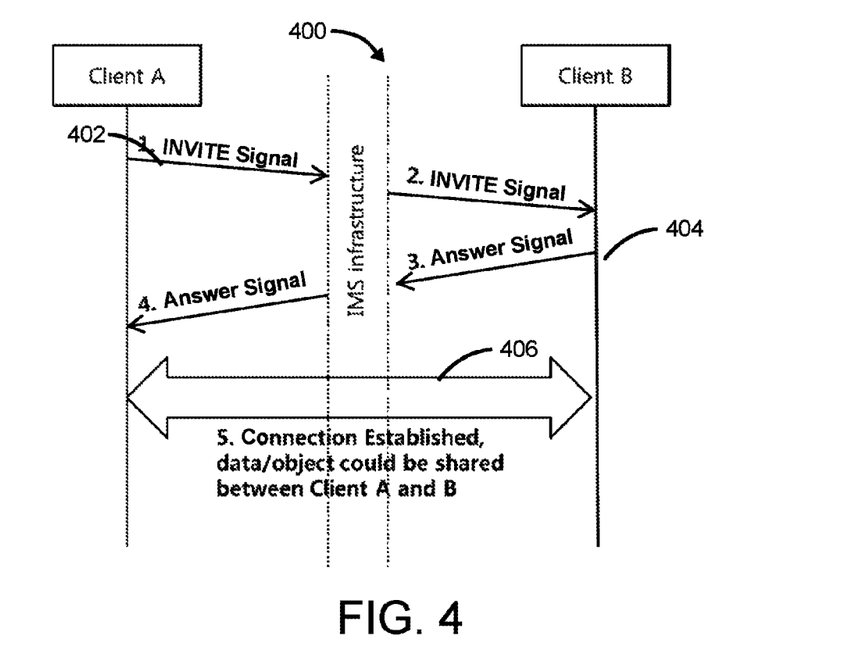
FIG. 4 illustrates a connection establishment process according to the invention.

FIG. 4 illustrates a connection establishment process 400 according to the invention. In step 402, the application 106A sends an Invite message (or signal) to the application 106B via the IMS infrastructure 104, inviting the application 106B to establish an IMS connection with the application 106A. The IMS infrastructure 104 forwards the Invite message to the application 106B.

In step 404, the application 106B sends an Answer message (or signal) via the IMS infrastructure 104 to the application 106A. The Answer message accepts the invitation from the application 106A to establish an IMS connection between the two applications 106A and 106B. In step 406, the applications 106A and 106B have established an IMS connection and may proceed to share exchange messages that include the capability exchanged in the process 300 described with reference to FIG. 3.

It will be understood that in other scenarios, the application 106B may send a message to the application 106A rejecting the invitation to establish an IMS connection. Furthermore, it will be understood that in other scenarios, the application 106B may invite the application 106A to establish an IMS connection, and the application 106A may accept or reject the invitation.

Preferably, the SIP protocol is used for the Invite and Answer messages and the IMS connection is established using the MSRP protocol. However, in other embodiments, other suitable standard protocols may be used for initiating and establishing the connection.

Figure 5:
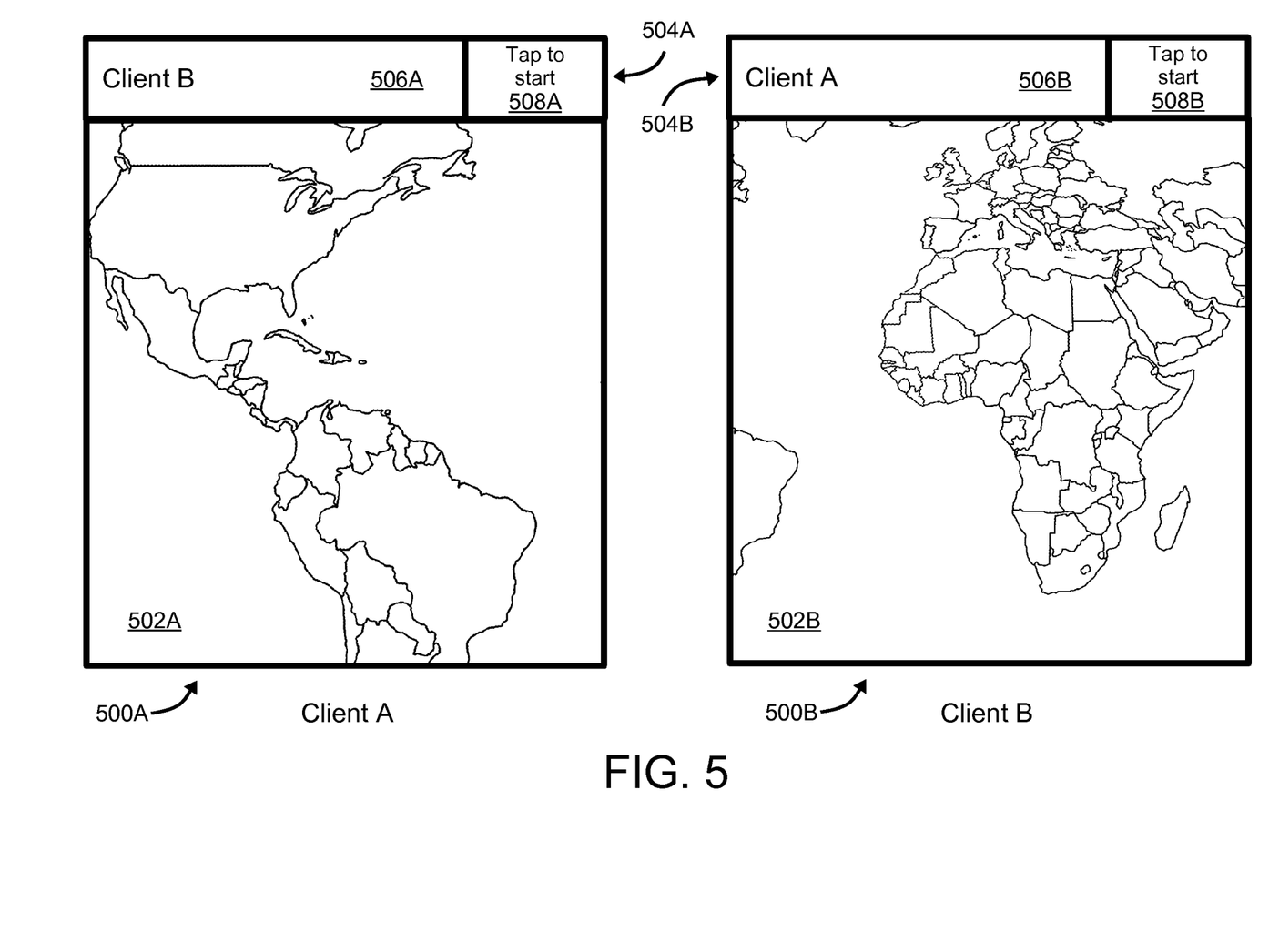
FIGS. 5-9 illustrate screen displays of applications sharing data via an IMS infrastructure according to the disclosure.

FIGS. 5-9 illustrate screen displays of applications sharing data via an IMS infrastructure according to the disclosure. FIG. 5 illustrates a screen display 500A of the application 106A and a screen display 500B of the application 106B. The screen display 500A includes a content window 502A and an information and control region 504A. The information and control region 504A includes a connection establishment control 508A, and an identifier window 506A. Similarly, the screen display 500B includes a content window 502B, an information and control region 504B, a connection establishment control 508B, and an identifier window 506B.

The applications 106A and 106B are map applications. The applications 106A and 106B may be the same application or may be map applications from different developers. In either case, however, as described with reference to FIG. 3, the applications 106A and 106B have exchange information indicating that each is able to send and receive messages that include the capability.

In both applications' screen displays, the content window 502 displays a portion of a world map currently being viewed using the application. In FIG. 5, the users of the applications are viewing different portions of the map. The applications 106A and 106B have performed the capability exchange process 300 described with reference to FIG. 3 and each is aware of the other's capability.

The identifier window 506A informs a user of the application 106A that the application 106B (identified as "Client B") is available to establish an IMS connection for use in exchanging the capability, for purposes that will be described in greater detail below. The connection establishment control 508A enables the user of the application 106A to invite a user of the application 106B to establish an IMS connection between the two applications. Similarly, the information and control region 504B informs the user of the application 106B that the application 106A ("Client A") is available.

Figure 6:
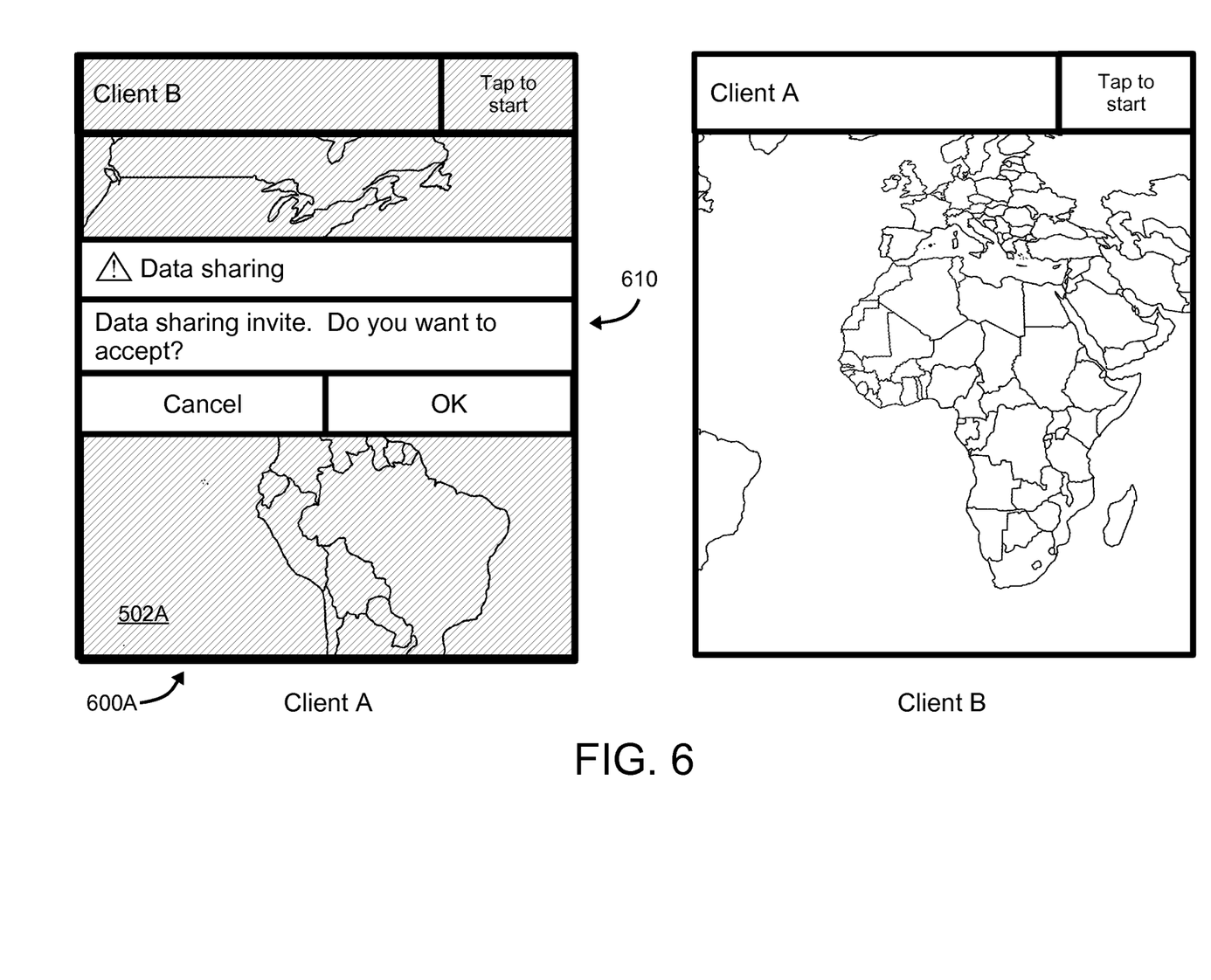

In FIG. 6, the user of the application 106B has activated connection establishment control 508B, and the application 106B has sent an Invite message to the application 106A. In response, a display screen 600A of the application 106A displays a dialog 610 informing the user of the invitation and providing OK and Cancel controls to permit the user to accept or reject the invitation, respectively.

Figure 7:
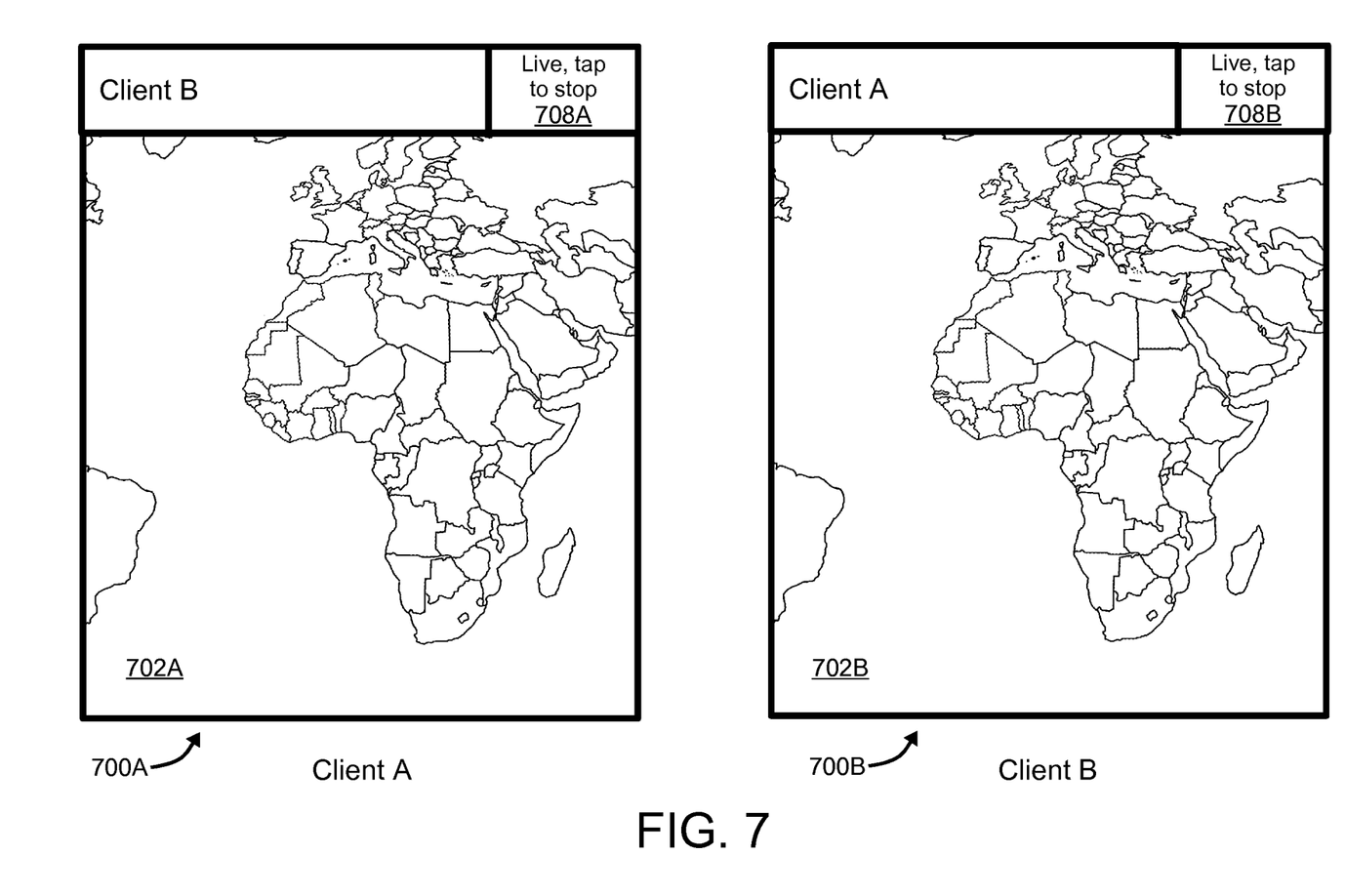

In FIG. 7, the user of the application 106A has activated the OK control and the application 106A has sent an Answer message to the application 106B, accepting the invitation. As described with reference to FIG. 4, an IMS connection has been established between the two applications. Further, as part of its programming, the application 106B has sent a message to the application 106A via the IMS connection, the message including the capability data structure describing a status of the application 106B, in this case, the portion of the world map currently being viewed by the application 106B in its content window 702B. In response, the application 106A has changed its content window 702A to match the view in the window 702B.

Further, both the connection establishment controls 708A and 708B have changed to controls that enable the respective users of the applications 106A and 106B to terminate the IMS connection and the associated status sharing. Should either user activate the control 708, the associated application 106 will send a Terminate message to the IMS infrastructure 104, causing the IMS infrastructure to terminate the IMS real-time object sharing (or live connection) between the applications.

Figure 8:
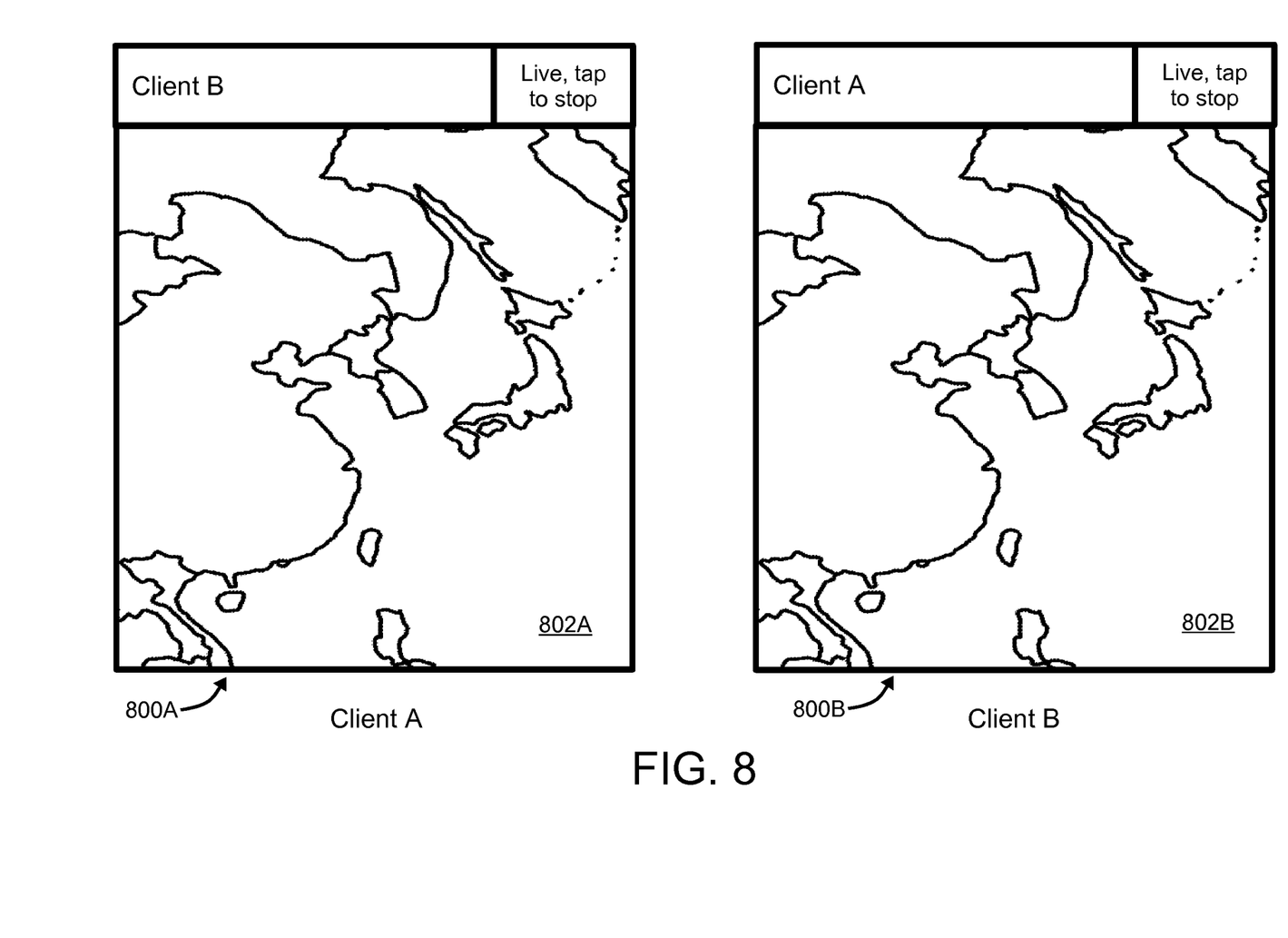

In FIG. 8, the user of the application 106A has moved the view in the content window 802A to another portion of the world map. In response to the change, the application 106A has sent a message including the capability data structure describing the new status of the application 106A. In response to that message, the application 106B has changed its content window 802B to display the same portion of the map.

Figure 9:
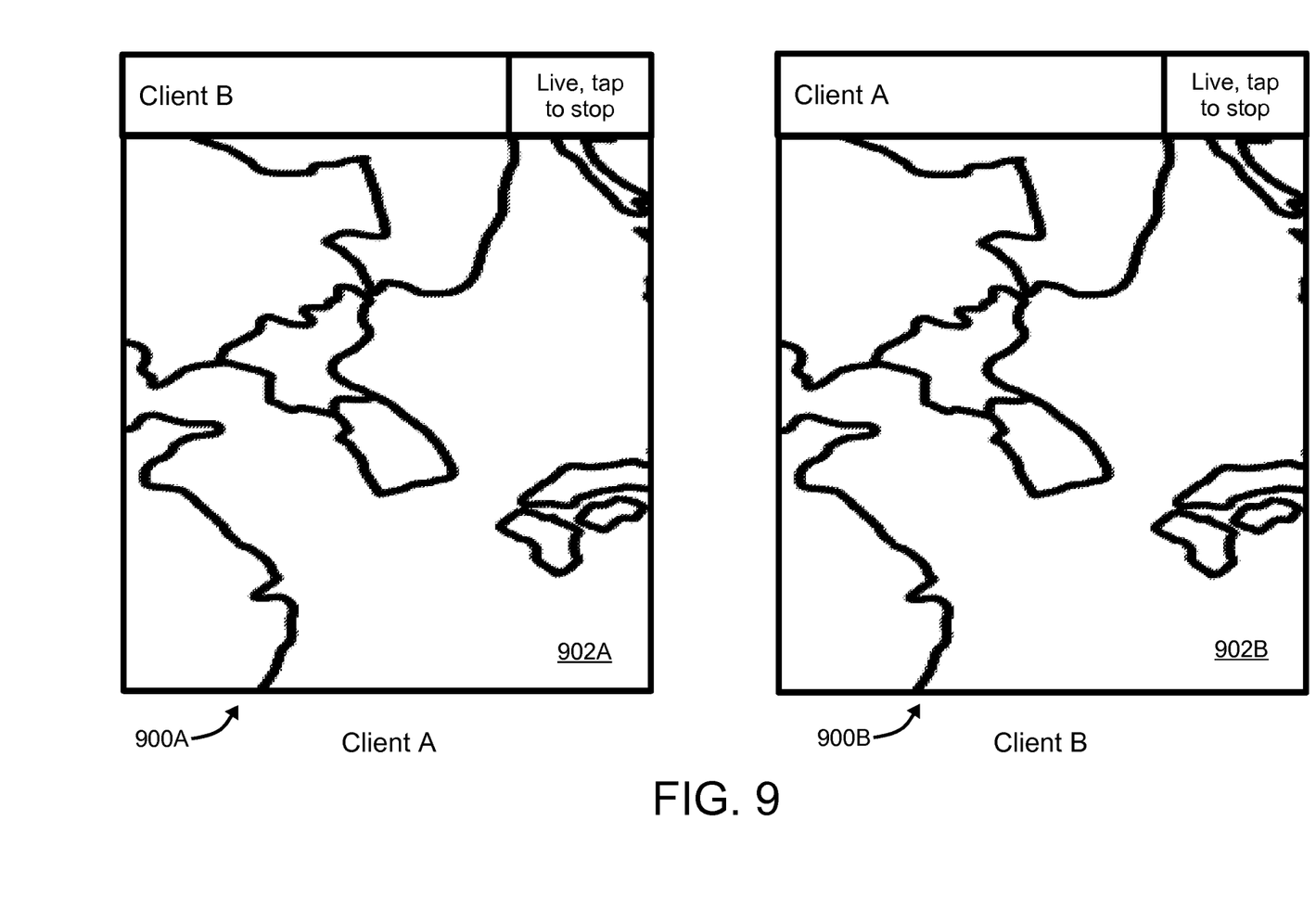

In FIG. 9, the user of the application 106B has zoomed the view in the content window 902B in to a smaller portion of the world map. In response to the change, the application 106B has sent a message including the capability data structure describing the new status of the application 106B. In response to that message, the application 106A has changed its content window 802A to zoom in on the same smaller portion of the map.

While the FIGS. 5-9 present an embodiment of the disclosure in which map applications use an IMS connection to exchange capability messages to synchronize the views presented by map applications, it will be understood that in other embodiments, other applications may exchange different capabilities to synchronize different application statuses. In one non-limiting example, the applications may provide Internet browser functionality, and the application status described in the capability messages identify a Web page being viewed, a portion of the page being viewed, and the activation of a link on the page, taking both browsers to a different Web page. In another example, the applications may be photo-viewing apps, and the system of the present disclosure used to permit users of the applications to view the same photo together.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sharing data between electronic devices via an IP Multimedia Subsystem (IMS) infrastructure, the method comprising:
   from a first application of a first electronic device, exchanging a capability with a second application of a second electronic device via the IMS infrastructure, wherein the capability is defined by a developer of the first application, wherein the capability is not a pre-defined capability in a User Capability Exchange (UCE) standard, and wherein the capability relates to an ability to communicate information about a data structure describing a status of the first application, and wherein the first application and the second application are a same type of application;
   from the first application, establishing an IMS connection with the second application via the IMS infrastructure;
   communicating with the second application, wherein communicating is based on at least one of:
   sending to the second application via the IMS connection data relating to the status of the first application stored in the data structure; or
   receiving at the first application via the IMS connection, data relating to a status of the second application stored in the data structure; and
   synchronizing the first application of the first electronic device and the second application of the second electronic device.

2. The method of claim 1, further comprising:
   publishing the capability of the first application; and
   receiving a notification of the capability of the second application.

3. The method of claim 2, wherein publishing the capability of the first application comprises publishing a keyword relating to the capability.

4. The method of claim 2, wherein receiving the notification of the capability of the second application comprises:
   subscribing to the second application's capability; and
   receiving a notice of the second application's capability.

5. The method of claim 1, wherein establishing the IMS connection between the first application and the second application comprises:
   inviting the second application to establish an IMS session;
   receiving an answer from the second application accepting the invitation; and
   establishing the IMS connection between the first application and the second application.

6. The method of claim 1, wherein the first application is developed by a first developer and the second application is developed by a second developer.

7. The method of claim 1, wherein the first application sends the data structure to the second application in response to a change of status of the first application.

8. An electronic device configured to share data via an IP Multimedia Subsystem (IMS) infrastructure, the electronic device comprising:
   a memory comprising a plurality of modules, the modules comprising an IMS module and a first application; and
   a processor configured to execute one or more of the plurality of modules in the memory,
   wherein:
   the IMS module is configured to communicate with a second electronic device via the IMS infrastructure; and
   the first application is configured to:
   exchange a capability with a second application of the second electronic device via the IMS infrastructure, wherein the capability is defined by a developer of the first application, wherein the capability is not a pre-defined in a User Capability Exchange (UCE) standard, and wherein the capability relates to an ability to communicate information about a data structure describing a status of the first application, and wherein the first application and the second application are a same type of application;
   establish an IMS connection between the first application and the second application via the IMS infrastructure;
   communicate with the second application, wherein communicating is based at least on one of send to the second application via, the IMS connection data relating to the status of the first application stored in the data structure and receive via the IMS connection data relating to a status of the second application stored in the data structure; and
synchronize the first application of the electronic device and the second application of the second electronic device.

9. The electronic device of claim 8, wherein the first application is further configured to:
publish the capability of the first application; and
receive notification of the capability of the second application.

10. The electronic device of claim 9, wherein the first application is further configured to publish the capability of the first application by publishing a keyword relating to the capability.

11. The electronic device of claim 9, wherein the first application is further configured to:
subscribe for the second application's capability; and
receive notice of the second application's capability.

12. The electronic device of claim 8, wherein the first application is further configured to:
invite the second application to establish an IMS session;
receive an answer from the second application accepting the invitation;
establish the IMS connection between the first application and the second application.

13. The electronic device of claim 8, wherein the first application is developed by a first developer and the second application is developed by a second developer.

14. The electronic device of claim 8, wherein the first application is further configured to send the data structure to the second application in response to a change of status of the first application.

15. A non-transitory computer readable medium embodying a computer program, the computer program comprising computer readable program code that, when executed by at least one processor, causes the at least one processor to:
from a first application of a first electronic device, exchange a capability via an IMS infrastructure with a second application of a second electronic device, wherein the capability is defined by a developer of the first application, wherein the capability is not pre-defined capability in a User Capability Exchange (UCE) standard, and wherein the capability relates to an ability to communicate information about a data structure describing a status of the first application, and wherein the first application and the second application are a same type of application;
from the first application, establish an IMS connection with the second application via the IMS infrastructure;
communicate with the second application, wherein communicating is based on at least one of:
sending to the second application via the IMS connection, data relating to the status of the first application stored in the data structure; or
receiving at the first application, via the IMS connection, data relating to a status of the second application stored in the data structure; and
synchronize the first application of the first electronic device and the second application of the second electronic device.

16. The non-transitory computer readable medium of claim 15, wherein the computer program further comprises computer code that when executed causes the at least one processor to:
publish the capability of the first application; and
receive a notification of the capability of the second application.

17. The non-transitory computer readable medium of claim 16, wherein the computer program further comprises computer code that when the capability of the first application is published, causes the at least one processor to publish a keyword related to the capability.

18. The non-transitory computer readable medium of claim 16, wherein the computer program further comprises computer code that when the notification of the capability of the second application is received, causes the at least one processor to:
subscribe for the second application's capability; and
receive a notice of the second application's capability.

19. The non-transitory computer readable medium of claim 15, wherein the computer program further comprises computer code that when the IMS connection with the second application is established, causes the at least one processor to:
invite the second application to establish an IMS session;
receive an answer from the second application accepting the invitation;
establish the IMS connection between the first application and the second application.

20. The non-transitory computer readable medium of claim 15, wherein the computer program further comprises computer code that when executed causes the at least one processor to: send the data structure from the first application to the second application in response to a change of status of the first application.

* * * * *